United States Patent [19]

Poisson

[11] 4,245,398
[45] Jan. 20, 1981

[54] SOLAR DEHYDRATOR

[76] Inventor: Leandre A. Poisson, Cherry Hill Rd., Box 119, Harrisville, N.H. 03450

[21] Appl. No.: 39,165

[22] Filed: May 15, 1979

[51] Int. Cl.³ ............................................. F26B 19/00
[52] U.S. Cl. .......................................... 34/93; 34/195; 34/197; 126/450
[58] Field of Search .................. 34/93, 192, 195, 197, 34/218, 232, 233, 22, 35; 126/428, 429, 431, 432, 450; 47/17

[56] References Cited

U.S. PATENT DOCUMENTS

| 1,536,935 | 5/1925 | Ross | 34/93 X |
| 2,688,476 | 9/1954 | Mayo | 34/93 X |
| 3,412,728 | 11/1968 | Thomason | 126/429 |
| 3,894,345 | 7/1975 | Zeltmann | 34/93 |
| 4,006,856 | 2/1977 | Nilsson | 98/31 X |
| 4,069,593 | 1/1978 | Huang | 34/93 |
| 4,109,395 | 8/1978 | Huang | 34/131 X |
| 4,114,288 | 9/1978 | Fowler | 34/93 |

Primary Examiner—Albert J. Makay
Assistant Examiner—Harold Joyce

[57] ABSTRACT

Apparatus and process for utilizing solar heat for dehydrating all form of vegetable matter.

1 Claim, 11 Drawing Figures

SOLAR DEHYDRATOR

Millions of dollars are wasted each year making, using, transporting, and keeping in stock, tin and aluminum cans, plastic and glass containers, cooking or otherwise preparing the vegetables, fruits, sea foods, etc., to be held in them until they are taken off the shelves of stores that sell them.

Because most of their contents are over 90% water, the accompanying waste of energy and money is practically enormous.

Food products, dehydrated by solar heat, at no cost for the energy involved, greatly reduced in size and weight, and requiring no daily expensive refrigeration, can be easily and quickly brought back to their normal condition, merely by the addition of water.

Figure 9:
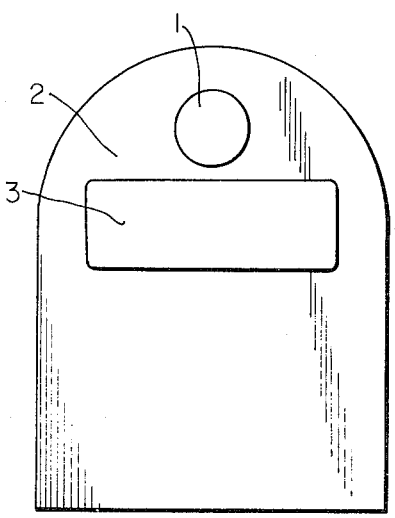
FIG. 9 shows the front end of my solar dehydrator, the end from which vegetation being dehydrated is placed within and later removed from the dehydrator.
Figure 10:
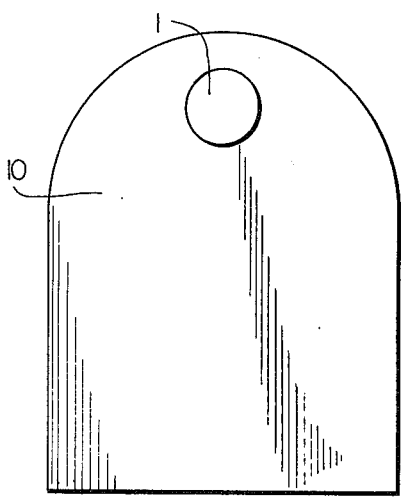
FIG. 10 shows the rear end member of my solar dehydrator.
Figure 11:
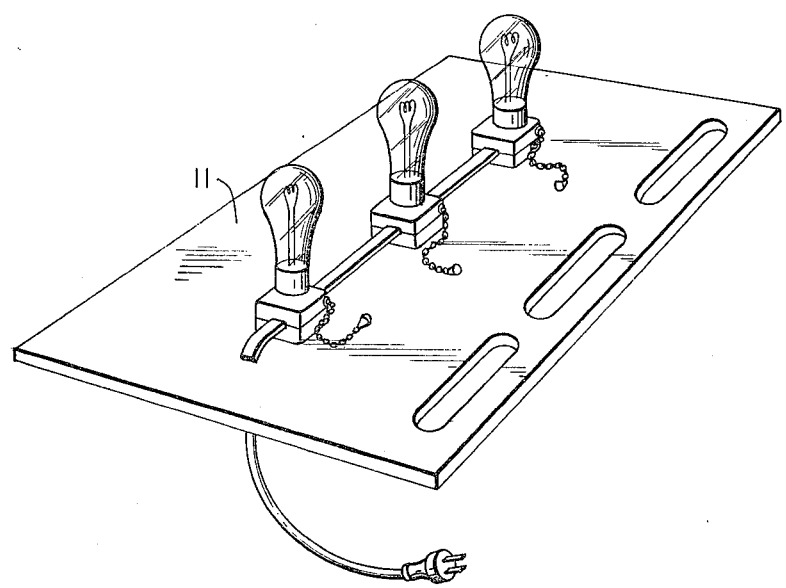
FIG. 11 shows artificial heat producing means that can be substituted for solar heat if the occasion demands it.

Four reinforcing rods may extend from the outside of the front member shown in FIG. 9 to the outside of the back member shown in FIG. 10, with two thumb screws (or wing nuts) holding each rod in place.

Figure 1:
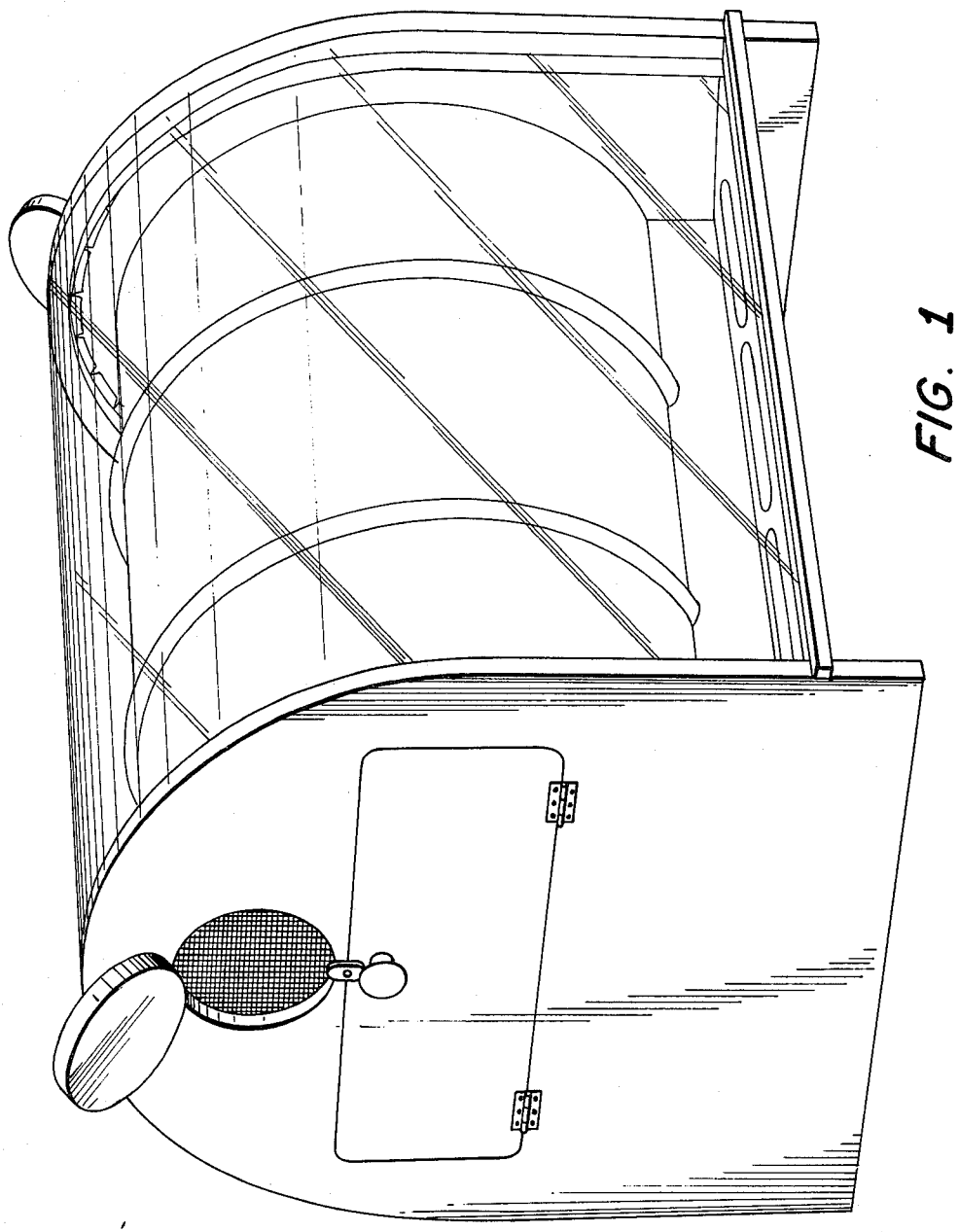
FIG. 1 is my solar dehydrator shown in perspective.
Figure 3:
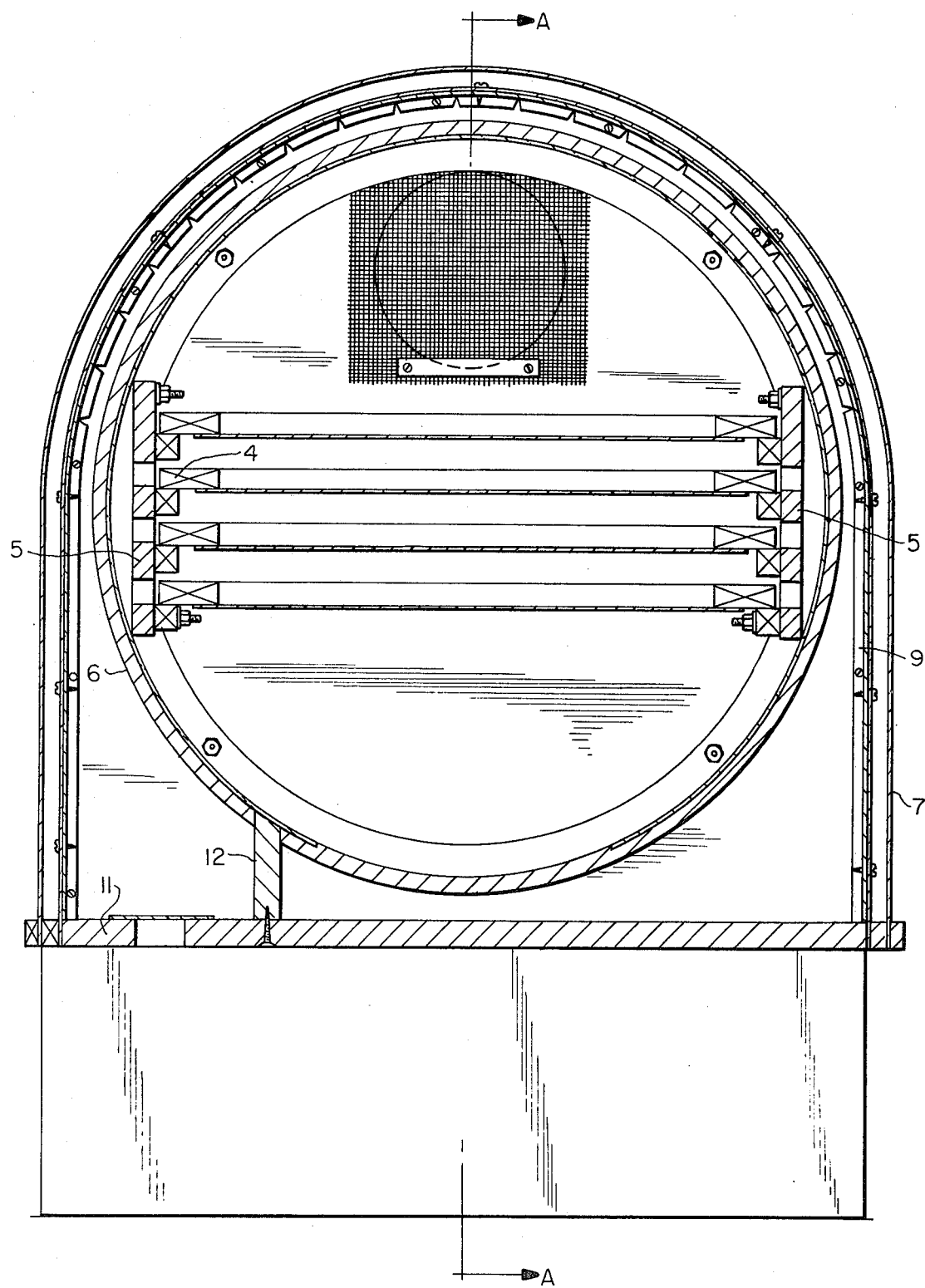
FIG. 3 is my dehydrator in section B—B in FIG. 4.
Figure 4:
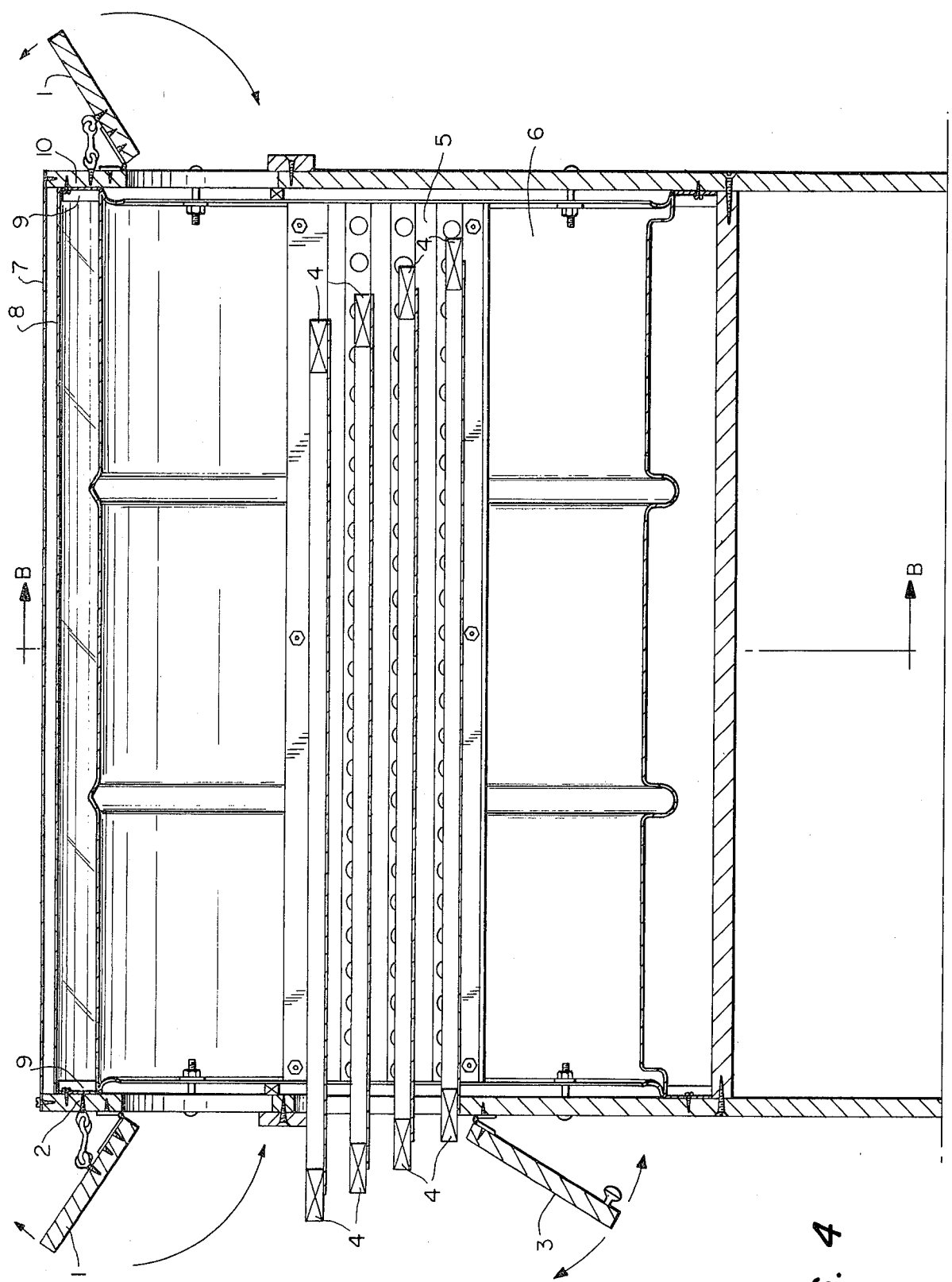
FIG. 4 is my dehydrator in section A—A in FIG. 3.
Figure 5:
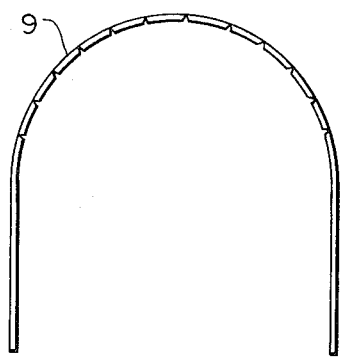
FIG. 5 is the curved clear plastic window surrounding the horizontal cylinder of my solar dehydrator.
Figure 6:
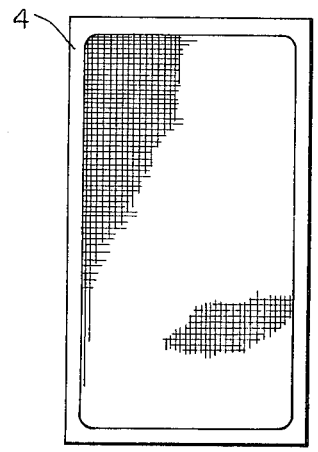
FIG. 6 is the plan view of a screen type tray on which foods or other vegetable matter rests while being dehydrated by solar heat in the air passing through the screen tray.
Figure 7:
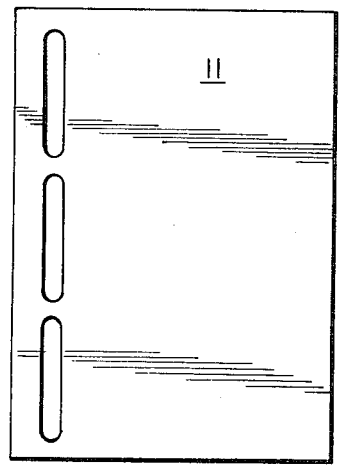
FIG. 7 is a wood floor member with long openings on one side for outside air to pass through and enter my solar dehydrator.

Behind window 1 in FIG. 4 at each end of my dehydrator is a suitable screen to keep flying insects out of the dehydrator. This screen is plainly shown in FIG. 3. It is also shown in FIG. 1.

Figure 2:
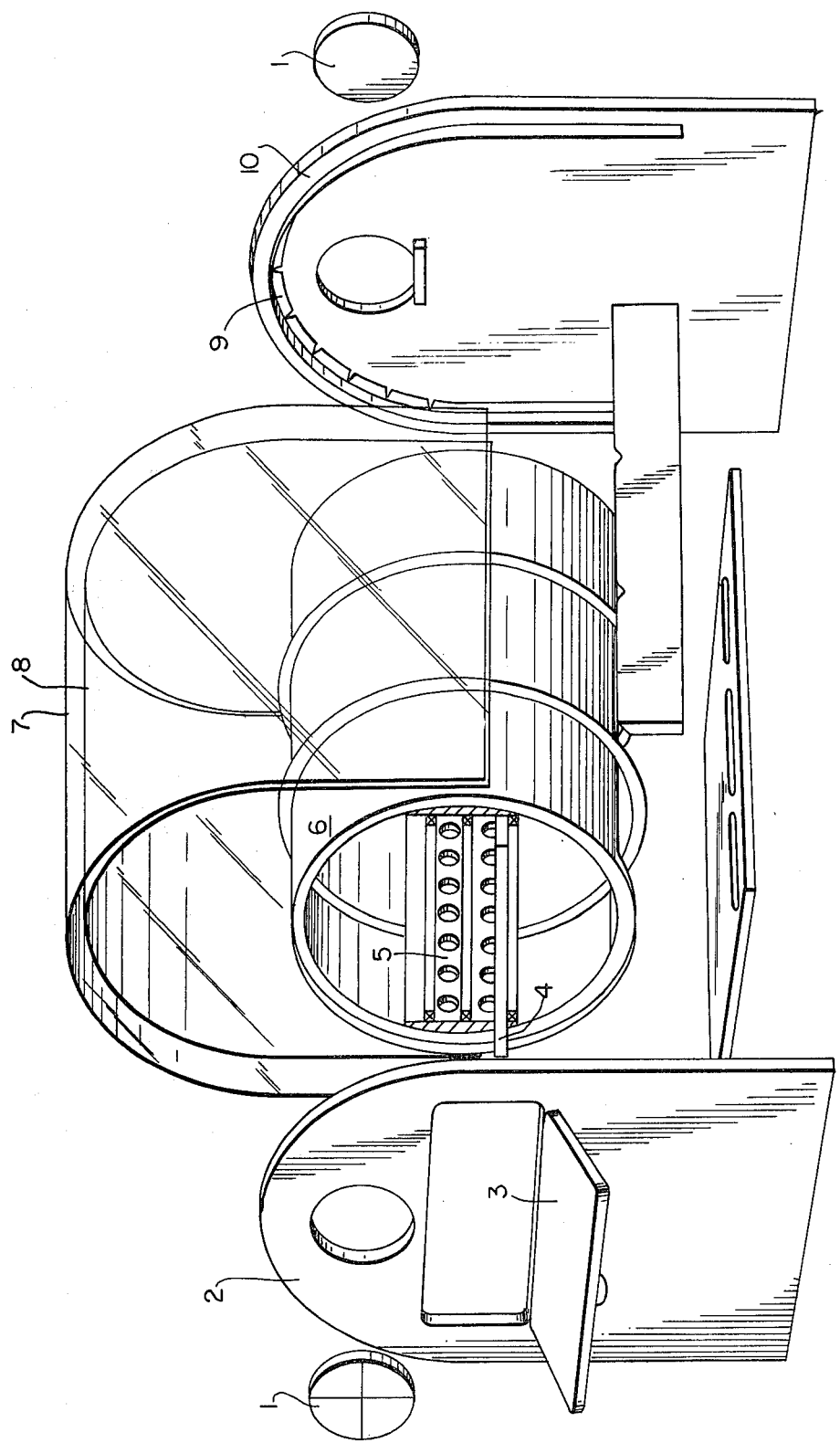
FIG. 2 is the same dehydrator shown dissassembled.

The wall member of the front wall is shown as numeral 22 in FIG. 2. A similar wall member shown as the back wall of my dehydrator at numeral 10, also in FIG. 2.

Numeral 3 is the hinged door member to cover the aperture through which the unhydrated vegetation passes inward and the dehydrated material passes outward after it has been solar dehydrated by the solar warmed air passing over and around it.

Numerals 4, 4, 4, etc., indicate the screened vegetation trays on which the material being dehydrated reposes while it is undergoing solar warm air dehydration.

Numeral 5 indicates the spaces between the trays 4 through which the solar heated air moves as it takes the water out of the vegetation as it is being solar dehydrated, inside my dehydrator. It also shows the side members holding trays 4, 4, etc.

Numeral 6 covers the cylindrical chamber painted black on its outside surface within which the screen trays 4 sit holding the vegetation while it is being solar dehydrated.

FIGS. 3 and 4 show numeral 7 to be the outer cover of transparent or translucent sheet (plastic sheet) as the outside cover of my solar dehydrator. Numeral 8 designates a similar sheet of transparent or translucent plastic sheet covering my cylindrical chamber 6 shown in FIGS. 2 and 4.

See FIG. 3 for a better view of side holding members 5 and 5.

Numeral 9 shows a curved angle strip of thin metal against which the plastic sheet 7 is bent and held fast.

As previously noted, numeral 10 marks the back side of my solar dehydrator (or the back end if it so should be called).

Numeral 12 shows a substantially vertical baffle board that guides the warmed air upward to be further solar warmed as it (the air) circles up around cylinder 6.

In FIG. 3 the south side of my solar dehydrator is the left side of the drawing . . . the right side of the drawing being the north side of my dehydrator.

Figure 8:
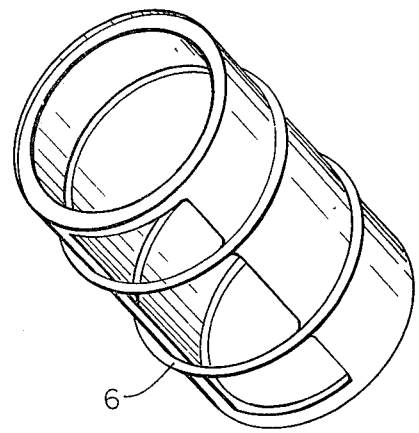
FIG. 8 is a view in perspective of my main dehydrator cylindrical chamber with large open areas in its lower portion to admit solar heated air across the vegetable material being dehydrated.

In its operation, due to the warming of the air going upward through the long and narrow holes in the wooden floor member 11, as this air circles cylinder 6, the black outer surface of 6 attracts the solar heat and makes the air warmer and warmer. The air then circles downward on the north side of cylinder 6 and into the large opening in cylinder 6 shown more distinctly in FIG. 8.

Inside cylinder 6, air goes up through screen vegetation trays 4, 4, 4, etc., and gradually removes the water from the vegetation resting on the screen trays.

After sufficient dehydration has taken place, the dehydrated material is removed through door 3, after which new vegetation to be dehydrated is again laid upon the screen trays 4.

The entire solar heated air dehydration operation is therefore extremely simple.

I claim:

1. A solar heated dehydrator for removing water from vegetation comprising: a substantially horizontal, thin sheet cylinder closed at both ends supported above a floor, said floor having one or more opening therein, said cylinder having a blackened outer surface for absorbing solar energy, a transparent, outer structural hood surrounding the cylinder for transmitting solar radiation to said cylinder blackened outer surface, one or more openings in the bottom surface of said cylinder for admitting air into said cylinder, opening means formed in said cylinder closed ends for exhausting heated air from said cylinder, a plurality of screened trays supported in said cylinder for supporting vegetation to be dehydrated, an access aperture in one of the closed ends of the cylinder, a hinged door member covering said aperture, said transparent hood and blackened cylinder surface forming a substantial curved space having a verticle baffle means located therein for guiding the air that enters said floor opening around said solar heated cylinder, said solar heated air passing through said opening in the bottom surface of said cylinder and out said opening means whereby vegetation on said tray is dehydrated.

* * * * *